United States Patent [19]

Akamatsu

[11] 4,160,938

[45] Jul. 10, 1979

[54] MOTOR DRIVE APPARATUS

[75] Inventor: Masahiko Akamatsu, Amagasaki, Japan

[73] Assignee: Mitsubishi Denki Kabushiki Kaisha, Tokyo, Japan

[21] Appl. No.: 831,650

[22] Filed: Sep. 8, 1977

[30] Foreign Application Priority Data

Sep. 29, 1976 [JP] Japan .................. 51-117508

[51] Int. Cl.² ............................................... H02P 5/28
[52] U.S. Cl. ................................. 318/82; 318/722; 318/810
[58] Field of Search ............... 318/67, 82, 171, 227, 318/67, 82, 722, 723, 724, 807, 808, 810, 812

[56] References Cited

U.S. PATENT DOCUMENTS

| | | | |
|---|---|---|---|
| 3,538,405 | 11/1970 | Borden et al. | 318/67 |
| 3,600,655 | 8/1971 | Karlin et al. | 318/67 |
| 3,720,863 | 3/1973 | Ringland et al. | 318/67 |
| 3,863,119 | 1/1975 | Tachibana | 318/82 |

OTHER PUBLICATIONS

IEEE IAS '77, "Commutatorless DC Drive for Steel Rolling Mill," pp. 263–271.

Primary Examiner—Gene Z. Rubinson
Attorney, Agent, or Firm—Oblon, Fisher, Spivak, McClelland & Maier

[57] ABSTRACT

A motor drive apparatus has G groups ($G \geq 2$) of m-phases inverter units and G groups ($G \geq 2$) of m-phases AC windings for feeding through the m-phases inverter units to the m-phases AC windings and G groups ($G \geq 2$) of DC power sources which are connected to G groups of the inverter units so as to form alternative series closed loops on the DC circuit.

8 Claims, 12 Drawing Figures

MOTOR DRIVE APPARATUS

BACKGROUND OF THE INVENTION

1. Field of the Invention

The present invention relates to an AC motor drive apparatus connected to inverters.

2. Description of the Prior Arts

The motor devices having the circuits shown in FIG. 1(a) and (b) have been known.

In FIG. 1(a), the reference numeral (100) designates a stator having plural groups of first and second AC windings (101),(102) in three phases; (120) designates a rotor having DC excitation windings (121),(201),(202) respectively designate a plurality of inverter units connected to the AC windings; (31),(32) respectively designate smoothing reactors which are connected in series to the DC input circuits of the inverter units. The pairs of DC input terminals ($p_1$, $n_1$) ($p_2$, $n_2$) of the inverter units (201), (202) are respectively connected through the smoothing reactors (31),(32) in parallel to the DC terminals (P, N) of the common DC power source (300).

In FIG. 1(b), a plurality of the inverter units (201), (202) are connected in series to the DC input terminals ($p_1$, $n_1$) ($p_2$, $n_2$). The series parts are connected through the DC reactor (30) to the common DC power source (300).

The inverter units (201),(202) and the DC power source (300) can be an electric valve circuit (200) such as an electric valve bridge having electric valves (2a) to (2f) as shown in FIG. 4(a).

In FIG. 1(a) or (b), the frequency of the torque pulsation can be increased by increasing commutation rate per 1 cycle of the motor (1) (switching times of the electric valve per each cycle of total groups of the inverter units) and the phase difference (electric angle of 30 degree in three-phase two groups) is given between the first AC winding (101) and the second AC winding (102) in order to decrease the torque pulsation coefficient and the inverter units (201),(202) are conductively controlled with phase difference each other.

However, in the parallel connection of FIG. 1(a), the voltage pulsation synchronized to the commutation of the inverter units are generated in the voltage $V_{pn1}$ between the DC terminal ($p_1$, $n_1$) of the first inverter unit (201) and the voltage $V_{pn2}$ between the DC terminal ($p_2$, $n_2$) of the second inverter unit (202), and the voltage pulsation respectively have the phase difference. When the frequency of the AC windings is low (for example, low revolution rate of a motor), the frequency of the pulsation is low whereby the pulsating transversal current is caused depending upon the instantaneous value difference of the inverter voltages $V_{pn1}$ and $V_{pn2}$. That is, the first invertor input current $I_1$ and the second inverter input current $I_2$ are changed to $I_1 > I_2$ or $I_1 < I_2$ depending upon the rotation.

When the mutual change of the currents are controlled by the reactors (32), (31), the smoothing reactors should be larger depending upon lower frequency. This is uneconomical.

When the pulsating voltage of the DC power source (300) is found, the beat phenomenon is caused by the power source input current pulsation caused by the pulsating voltage and the commutation of the inverters. That is, when the commutation is given at the peak value of the power source input current, the commutation overlapping angle of the inverters is increased. The DC voltage of the inverter unit is increased and the mean value of the DC input current of the inverter unit is decreased. Moreover, two inverter units are commutated in phase difference. When one inverter unit is synchronized to the peak value of the power source current pulsation, the other inverter unit is synchronized to the bottom value of the power source current pulsation. The phase relation for generation of beat is shifted. The beat is maximum when the commutating frequency of the inverter unit is substantially same with the pulsating frequency of the power source (300). The beat is caused at relatively high revolution rate of the motor. (relatively high frequency of AC winding frequency). The beat frequency is low frequency and it appears as the pulsating transversal current of the DC input currents. The smoothing reactor for preventing the beat should be large. This is also uneconomical.

The inverter pulsation in low frequency zone and the beat pulsation in high frequency zone appear as the torque pulsation of the motor. The purpose for decreasing the torque pulsation is not attained.

In the serial connection system of FIG. 1(b), two inverter units (201), (202) are connected in series whereby in DC voltage $V_{pn1}$ and $V_{pn2}$ of the inverters are serial sum and the resultant inverter voltage for the DC power source (300) is $V_{pn1} + V_{pn2}$, so as to be considered as one inverter. The DC input currents of the inverters are equal whereby the transversal pulsation of DC current as found in the case of FIG. 1(a) is not caused.

However, the inverter units have potential difference $\Delta V$ as DC current, whereby the mean potential differences $\Delta \overline{V} = (\overline{V}_{NU2} - \overline{V}_{NU1})$ is caused between the neutral potentials $\overline{V}_{NU1}$ and $\overline{V}_{NU2}$ of AC windings (ideal neutral potential in $\Delta$ connection such as ring connection). (In FIG. 1(a) $\overline{V}_{NU1} = \overline{V}_{NU2}$). Accordingly, it is necessary to give insulation having higher insulation withstand voltage for $\Delta V$ as the earth insulation of AC windings (insulation to iron core) and the insulation between windings.

When the serial numbers (G) of inverter units are increased, higher degree of insulation withstand voltage is required. However, when the insulation is increased, the ratio of the insulator in the slots is increased to decrease the effective sectional area of the conductor, whereby the uneconomical motor is formed and the motor having high leakage inductance coefficient is formed and the commutating characteristics of the inverter units are adversely affected.

When the leakage inductance is increased, the control response velocity of the motor and the input current allowance change velocity dI/dt (di/dt of ripple; current rising dI/dt and current falling dI/dt) are decreased, whereby the characteristics of the motor are lowered. The deterioration of characteristics is especially trouble in the case of a quick response motor which sould have high response such as a motor for mill.

As described above, in the case of FIG. 1(a), the transversal pulsation is caused in the DC input current. This is uneconomical for preventing the transversal pulsation. The characteristic of torque pulsation is deteriorated.

In the case of FIG. 1(b), high insulation withstand voltage of the AC windings is required to be uneconomical. The response is also deteriorated.

SUMMARY OF THE INVENTION

It is an object of the present invention to provide a motor device having smaller beat and beat torque pulsation caused by the beat.

It is another object of the present invention to provide a motor device having lower insulation withstand voltage of windings of the motor.

It is the other object of the present invention to provide a motor device having lower torque pulsation by multi-phase structure.

The present invention is to provide a motor device such as DC multi-phase type thristor motor which comprises a motor having plural groups of armature windings, plural groups of inverter units and plural groups of DC power sources.

The armature winding in each group is respectively connected to the inverter in each group, so as to feed the current through the inverter to the windings. The inverter units in each group are alternatively connected to the DC power source in each group to form one closed loop.

Figure 1A:
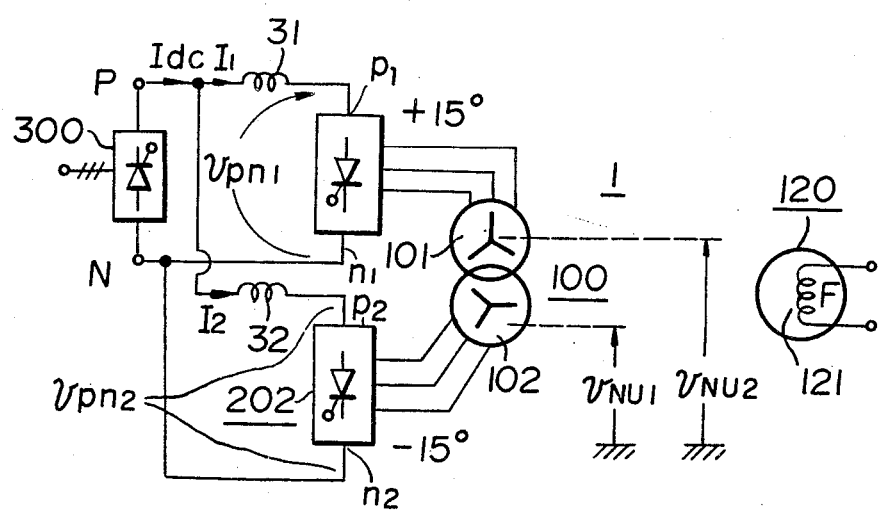
FIGS. 1(a), 1(b) are respectively circuit diagrams of the conventional devices.
Figure 1B:
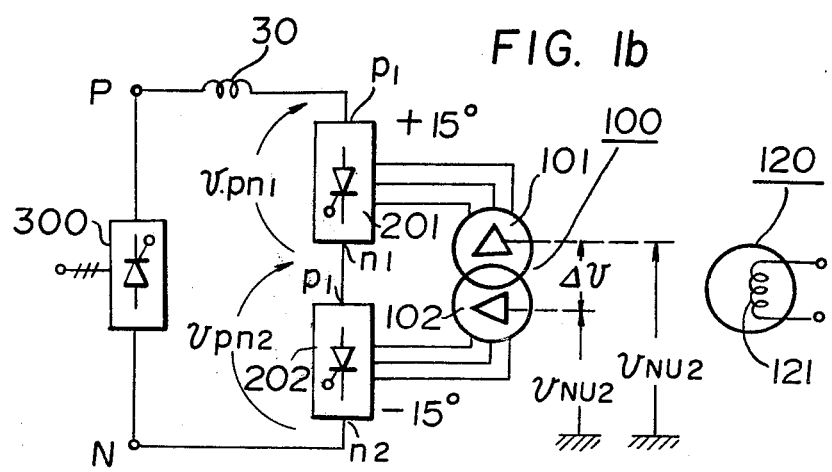

DETAILED DESCRIPTION OF THE PREFERRED EMBODIMENTS:

The present invention is to impart the decrease of the pulsation of DC imput current of the inverter units and the decrease of the insulation withstand voltage of the AC windings.

Referring to the drawings, certain embodiment of the present invention will be illustrated in detail.

Figure 2A:
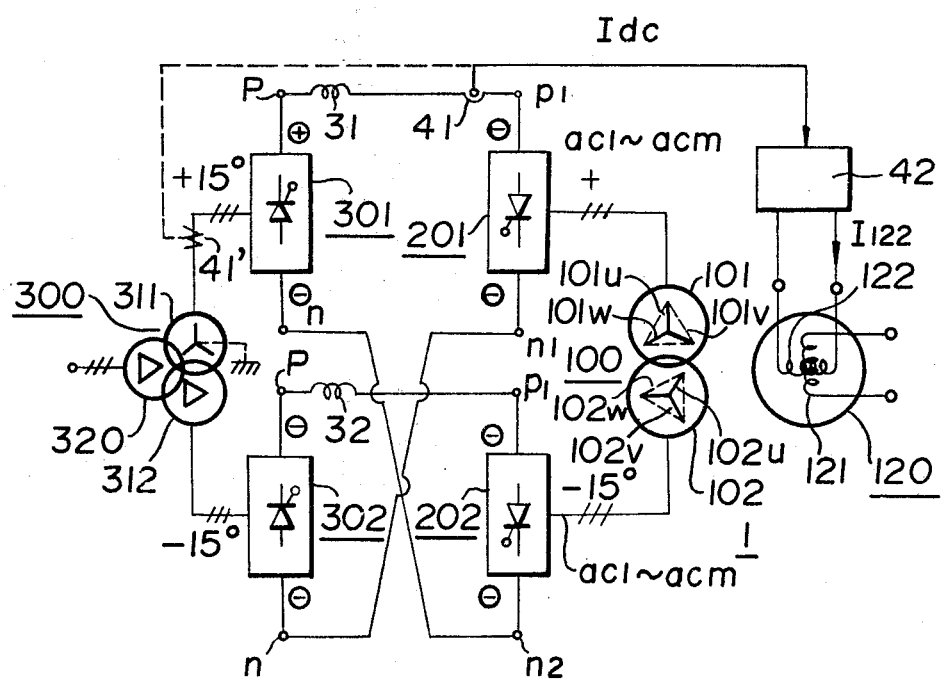
FIGS. 2(a) and 2(b) is a circuit diagram of one embodiment of the present invention.

FIG. 2 (a) is a circuit diagram of one embodiment of synchronous motor as the motor (1) wherein the reference numeral (120) designates a rotor comprising a main field winding (121) and series type field winding (second field winding) (122). The second field winding (122) can be series type field winding formed on the same magnetic axis of the main field winding (FIG. 6 (a)) or the compensating winding having perpendicular magnetic axis to the main field winding (121) (FIG. 6 (b)). The case having both of the same magnetic axis and the perpendicular magnetic axis can be considered.

The reference numeral (100) designates a stator comprising plural groups of first and second AC windings (101),(102) in m-phase (illustrated in case of m=3). The AC windings (101),(102) respectively have phase windings (101u) (101v)(101w) and (102u)(101v)(102w) which are connected in Y connection. Each group of the AC winding has M (FIG. 2 is illustrated in case of M=3) number of AC input terminals for feeding alternative current to m-phase winding thereof. The motor (1) is formed with the stator (100) and the rotor (120).

Figure 2B:
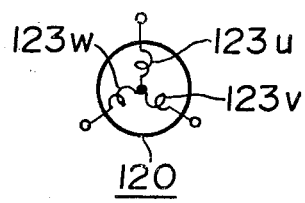

The rotor (120) of the motor (1) is a rotor having a DC field winding (121) or a rotor having convex poles or a rotor having the first and second DC field windings (121)(122) (plural field windings (121)(122) (plural fields or 2 axes fields) in the case of the synchronous motor. In the case of the cage type induction motor, it is a rotor (120) having the cage conductor (124)(FIG. 6(c)). In the case of the wound-rotor type induction motor, it is a rotor having primary windings (123v)-(123w) in multi-phase as shown in FIG. 2(b). In the case of the wound-rotor type induction motor, secondary windings are equipped in the stator side and are the AC windings (101),(102).

The reference numeral (42) designates a series type exciting means for feeding the current $I_{122}$ proportionally response to the DC current $I_{dc}$ to the series type field winding (122). The simple series type exciting means (42) can be formed by connecting the series type field winding (122) in series to the DC circuit.

When the series type field winding (122) is a compensating winding, it is connected in series through the polarity converter such as a bridge connection circuit having a switch (or a thyristor switch) so as to excite in the reverse polarity. The series type exciting means (42) can be a DC current controlling device which receives the output of the DC current detector (41) or the proportional response detecting means (41') (such as AC current transformer in AC side of an electric valve circuit) as the input signal so as to generate the output current being proportional to the input signal or being proportional absolute valve in the reverse polarity. A control electric valve circuit or a chopper control device can be used as the DC current controlling device.

In the former direct serial connection system, the DC power controlling device need not be used. In the latter relative control system using the DC power controlling device, the exciting current $I_{122}$ can be smaller than the main DC current (the number of turns can be increased) whereby the spring equipped with the rotor can be small and the potential can be lower than the potential of the low voltage control circuit (it is not high potential of the main circuit) whereby this is advantageous from the viewpoint of insulation of the series type field winding (122).

Figure 4A:
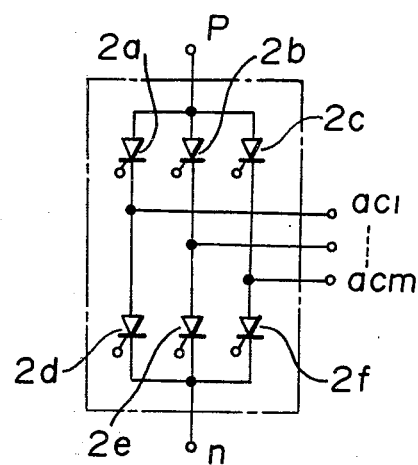
FIGS. 4(a) and 4(b) are respectively circuit connections of embodiments of inverter units used in the present invention.

FIG. 4(a) shows one embodiment of the connection when the inverter units (201),(202) are the separately excited inverters which are commutated by inner electromotive force of the AC windings of the motor.

Figure 4B:
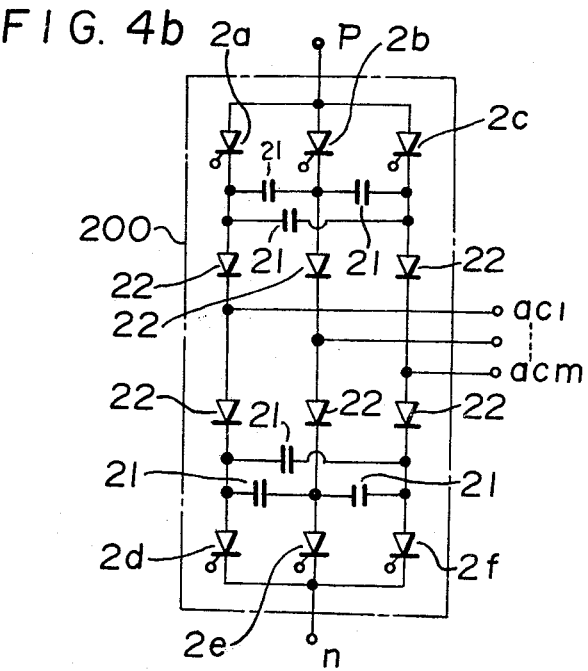

FIG. 4(b) shows one embodiment of the connection when the inverter units are the self excited inverters or forced commutating inverters for forcible commutation. In FIGS. 4(a),(b), the reference numerals (2a) to (2f) respectively designate thyristors; (21) designates a forcible extinction capacitor and (22) designates a series diode.

The inner electromotive force commutation type inverter as shown in FIG. 4(a), is suitable for the synchronous motor having exciting means and the wound-rotor type induction motor. The self-excited commutation type inverter as shown in FIG. 4(b) is suitable for the cage type induction motor as well as the high efficiency and low torque pulsation of the synchronous motor or the wound-rotor type induction motor.

The reference numerals (301),(302) respectively designate the first and second DC power sources. The DC power sources (301),(302) and the inverter units (201),(202) are connected in a series closed loop of the DC circuit as first DC power source (301)-first inverter unit(202)-second power source (302)-second inverter unit (202)-first DC power source (301). The DC power sources and the inverter units are alternatively arranged in the connection.

The reference numerals (31),(32) respectively designate smoothing DC reactors and are connected in series to one or more of the DC lines connecting the DC power sources and the inverter units. When the combining pulsating voltage of the DC power sources (301), (302) is low, it is possible to eliminate the DC reactors (31),(32).

The reference numeral (41) designates a DC current detector for detecting the DC current in the series circuit of the DC power source and the inverter unit. It is possible to connect the proportional response detecting means (41') having the AC current transformer in the AC side of the electric valve circuit as shown by the broken line, instead of the DC current detector (41).

The reference numeral (300) designates a phase shift transformer which has a primary winding (320) and secondary windings (311),(312).

In the embodiment of FIG. 2, when the ideal neutral potential of the first DC power source (301) is decided as the reference potential (zero potential), the terminal p of the first DC power source (301) and the terminal $p_1$ of the first inverter unit (201) are the same DC $\oplus$ potential (mean potential neglecting pulsation); and the terminal $n_1$ of the first inverter unit (201) and the terminal n of the second DC power source (302) are the same DC $\ominus$ potential; and the terminal p of the second DC power source (302) and the terminal $p_1$ of the second inverter unit (202) are the same DC $\oplus$ potential; and the terminal $n_2$ of the second inverter unit (202) and the terminal n of the first DC power source (301) are the same DC $\ominus$ potential.

The potential of the DC input terminal of the inverter unit is changed alternatively to positive and negative whereby the sum is not increased. Accordingly, the ideal neutral DC potentials of the first AC winding (101) and the second AC winding (102) are substantially in the reference potential. That is, the neutral potentials of the both AC windings have not DC potential difference $\Delta V$. Accordingly, the insulation of the AC windings can be considered only for AC voltage of the pair of AC windings (for the voltage for neutral point or the line voltage). The insulation withstand voltage can be low regardless the serial connection in the DC lines.

In the embodiment of FIG. 2, two groups of the AC windings, the inverter units and the DC power sources are used. It is possible to use desired plural groups (G groups) of them.

Figure 3A:
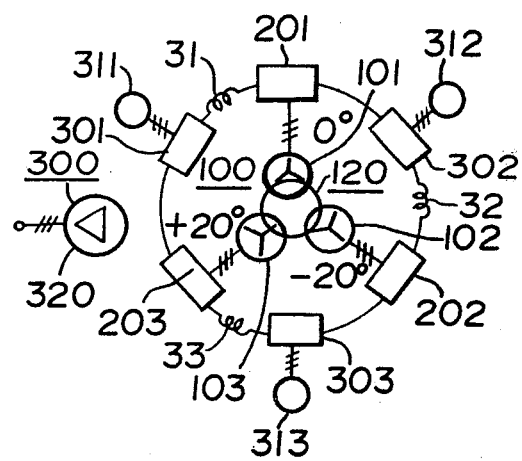
FIGS. 3(a) and 3(b) are respectively circuit diagrams of the other embodiments of the present invention.
Figure 3B:
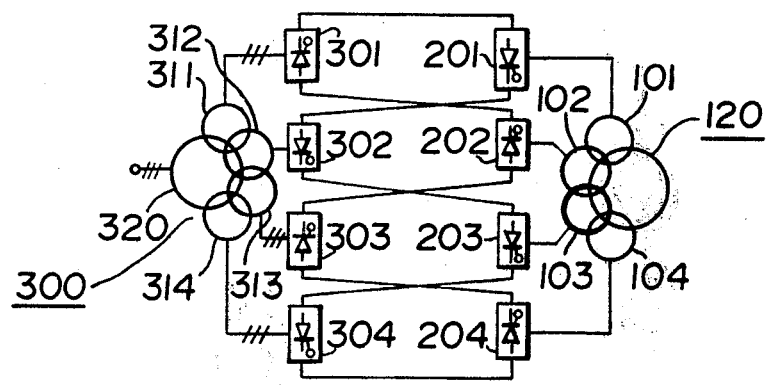

The embodiment of G=3 is shown in FIG. 3(a). The embodiment of G=4 is shown in FIG. 3(b). The AC windings have each phase difference of $\pi/9$ of electric angle. In the embodiment of G=4 and m=3, the AC windings have each phase difference of $\pi/12$ of electric angle. In usual, when m designates number of the phase of a pair of AC windings and G designates number of the group, the phase difference between the adjacent groups is $\pi/mG$ in the case of odd number of m; and it is $2\pi/mG$ in the case of even number of m. The torque pulsation can be minimized.

In the embodiment of FIGS. 2 to 4, when the G groups of DC power sources (301) to (30G) are the electric valve rectifying circuits (for example FIGS. 4(a),(b), the phase difference can be formed between the G groups of the AC power sources as the same with the connections G groups of the inverter units (201) to (20G) and G groups of the AC windings (101) to (10G). When the G groups of the AC power sources are given from the common AC power source through the phase shift transformer (320) and (311) to (31G) the phase number for rectification for the common power source is increased and the high harmonics obstruction in AC power source system is decreased and the power source pulsations of the DC closed loop current i.e. the DC input current of the inverter units are remarkably decreased. Moreover, the power source rectification pulsating ripple is decreased as well as the beat pulsating current and the beat torque pulsation caused by neutral action of the phenomenon of the inverter commutation (current instantaneous value dependency of the commutation overlapping angle) are also remarkably decreased (reversely proportional to square or cube order of the group number G). The present invention has the remarkable combined effects for decreasing the beat torque pulsation of the motor device.

In the embodiments of FIGS. 2 and 3, when the output voltages of the G groups of DC power sources (301) to (30G) are controlled, it is possible to employ a simultaneous controlling method in which they are simultaneously changed in the same voltage relationship, or a sequential controlling method in which the DC power voltages in one group are changed (rise or fall) and sequentially the DC power voltages in the other group are changed.

When the DC power sources (301) to (30G) are the electric value circuits, the former imparts the advantage of lower AC power source high harmonics obstruction and DC rectifying pulsation, and the latter imparts the advantage of smaller AC power source reactive power.

Figure 5:
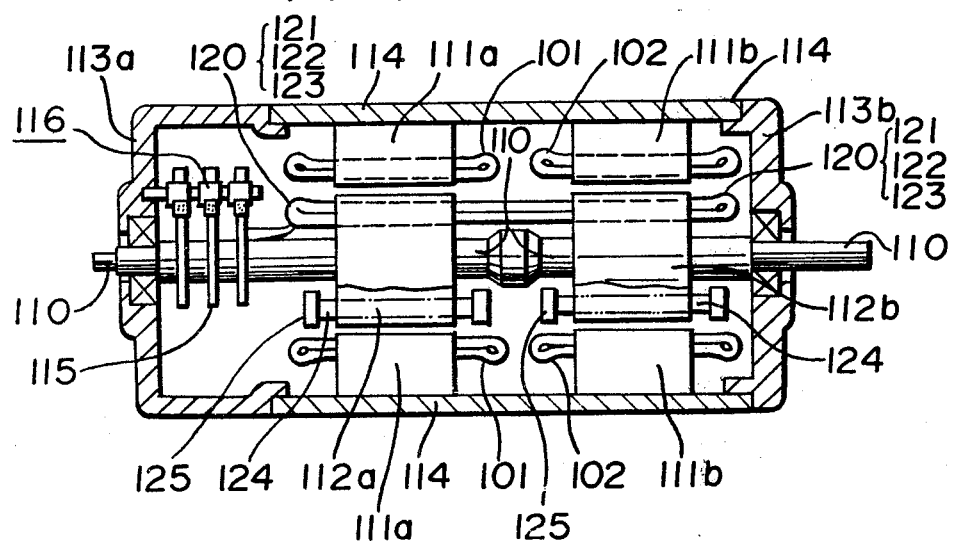
FIG. 5 is a schematic view of one embodiment of arrangement of windings of the motor of the present invention.

Referring to FIGS. 5 and 6, the embodiments of the arrangements of the windings for the stator (100) and the rotor (120) shown in FIGS. 2 and 3 will be illustrated.

In FIG. 5, two groups of stator cores (111a), (111b) are coaxially fitted on the common frame (114) and the rotor cores (112a), (112b) are equipped on the common shaft (110) and the first AC winding (101) and the second AC winding (102) are respectively wound on the first stator core (111a) and the second stator core (111b). The rotor winding (120) (the DC field winding (121) or the series type field winding (122) or the compensating winding (122) in the case of the synchronous motor; and the primary multi-phase winding (123) in the case of the wound-rotor type induction motor) can have the common winding on the first rotor core (112a) and the second rotor core (112b), (passing the slots for both cores by one conductor). It is also possible to wind on each of cores and the windings are connected in series or in parallel as the same with the stator. In the case of the cage type rotor, the cage conductors (124) and the connecting rings (125) can be connected as shown by the slant lines. It is also possible to pass the cage conductor through both core slots and to connect the rings at only both ends.

It is clear that the slip ring (115) and the brush (116) can be equipped on the motor having a rotor windings (120).

As shown in FIG. 5, two groups of the AC windings can be connected. When the rotor conductor is a separate cage type one, the phase shift of the AC windings can be given as desired and it is given by the conductive control phase of the inverter units.

In the cases of the cage type rotor having the rotor conductor passing through both cores (112a), (112b) and the rotor having the primary multi-phase winding (123) of the wound-rotor type induction motor and the rotor having the DC field windings (121)(122), the peripheral positions of the slots for the stator winding are shifted for the predetermined electric angle ($\pi/mG$ or $2\pi/mG$) or the peripheral positions of slots for rotor conductor are shifted for the predetermined electric angle. These are mutual electromagnetic positions whereby both of them can be combined. The phase difference of the two groups of AC windings can be formed.

The embodiment of two groups has been illustrated. It is possible to form the spit type motor having G groups of AC windings in the same manner.

It is also possible to directly connect motors (G number) in the spit type or to connect with gears between the shafts.

Figure 6A:
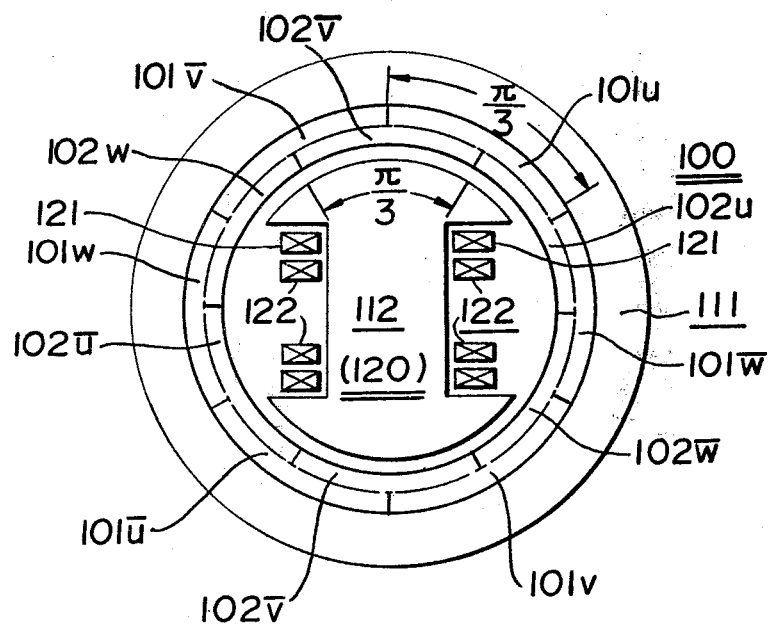
FIGS. 6(a), 6(b) and 6(c) respectively show the arrangements of windings of the motor of the present invention.

FIG. 6 (a) shows an embodiment wherein the slots of the common stator core (111) are divided into the upper and lower layers, and the first AC windings (101u, 101ū) to (101w, 101w̄) and the second AC windings (102u, 102ū) to (102w, 102w̄) are respectively fitted. In order to simplify the illustration, the convex poles type three phase-two poles case is shown. The phase band of each phase (electric angle for distribution of phase belt to slots fitting the conductor for one phase) is $\pi/3$. The belts zones (101u) to (102w̄) of FIG. 6(a) show the windings of conductor fitted to the slots in the zone and the windings for each of the phases (referring to as u,v,w and the reverse polarity of ū, v̄, w̄) are formed by connected in series parallel connection. For the convenience shown in FIG. 6, the first winding is arranged on the outer peripheral belt of the stator slots and the second winding is arranged on the inner peripheral belt of the stator slots. The relation of the same slot (space side and opposite side) can be exchanged.

For example, the half of (101u) can be arranged in the opposite side of the slots and the other half of (101u) can be arranged in the space side of the slots. The same arrangements are made for all of the phase belts so as to alternatively fit the first and second windings in the space side and the opposite side, whereby the leakage inductances for all groups are balanced.

FIG. 6 (a) shows the schematic view of the salient pole type rotor (illustrated by two poles) having the field winding (121) and the series type field winding (122). In the practical structure, the convex pole type synchronous motor structure having more pole numbers can be employed.

Figure 6B:
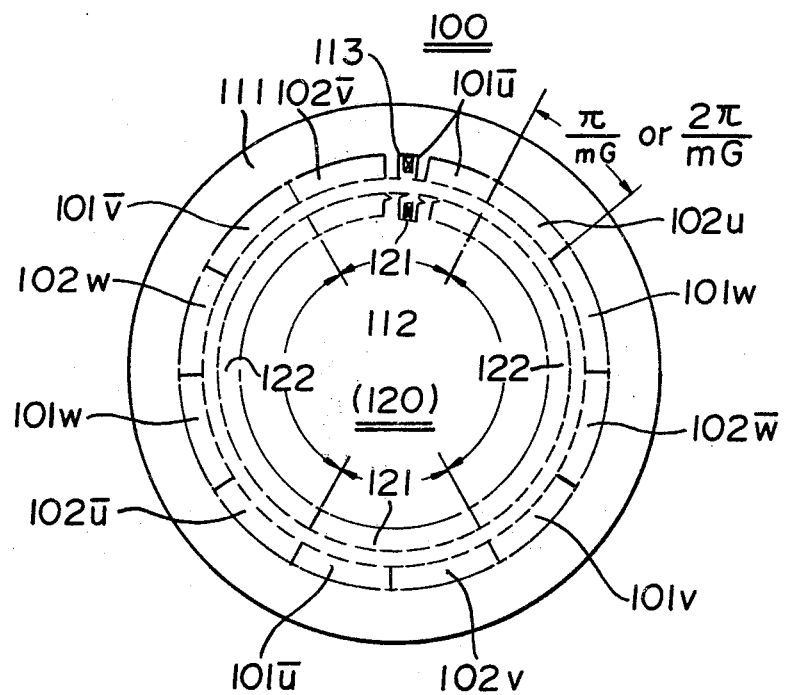

The cylindrical rotor of FIG. 6(b) can be used instead of the rotor of FIG. 6(a).

Figure 6C:
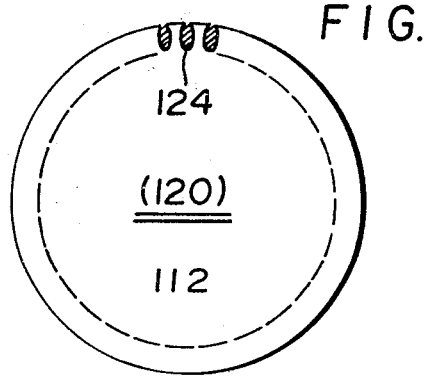

When the cage type rotor (120) of FIG. 6(c) having the cage conductor (124) is replaced to the field rotor (120) of FIG. 6 (a), the stator (100) of FIG. 6(a) can be used for the cage type motor.

FIG. 6(b) shows the other combination of the stator (100) and the cylindrical rotor (120). In FIG. 6, the phase band of the winding for one phase of one group of the AC winding is $\pi/mG$ (m=odd number; FIG. 6(b) is illustrated in case of m=3) or $2\pi/mG$ {m=even number; FIG. 6(b) is illustrated too in case of m=6 from the viewpoints of the reverse polarity relations of (u; ū), (v; v̄ and (w, w̄) as different windings}.

In FIG. 6(a), two groups of the AC windings are fitted to the slots which are divided in the radial direction. On the contrary, in FIG. 6(b), the windings are divided in circumferential direction and the phase band is divided in the arrangement of the windings. When the windings are divided in the relative direction, the slot number for each group and each phase is decreased whereby the space high harmonic waves are increased. However, the divided group number G can be remarkably increased in comparison with the case of FIG. 6(a) dividing at the outer peripheral/inner peripheral. Moreover, there is no difference of the sizes of the windings whereby the same type of windings can be used and the complicated connections of the ends of the windings can be easily attained advantageously. The stator winding method shown in FIG. 6(b) can be also used for the convex pole type rotor and the cage type rotor.

The rotor (120) shown in FIG. 6(b) is the cylindrical rotor which has the main field winding (121) and the compensating winding (122) having cross magnetic axis.

The distribution band (corresponding to phase band) of the main field winding (121) is substantially the same with or smaller than the distribution band of the compensating winding (122).

In the conventional cylindrical synchronous motor, the distribution band of the main filed winding (121) is about $\frac{2}{3}\pi$. In the embodiment of FIG. 6(b), the distribution band of the main field winding is less than $\pi/2$, whereby the spaces can be small and the normal field loss can be small and the effective space magnetic flux can be much.

What is claimed is:

1. A motor drive apparatus comprising:

an AC motor having G groups (G≧2) of m-phase AC windings of which each group includes m-phase AC windings with a number M of AC input terminals (M≧2);

G groups of m-phase inverter units of which each unit has a plurality of solid-state switch elements, a pair of DC input terminals and a number M of AC output terminals respectively connected to the M AC input terminals of each group of the G groups of m-phase AC windings; and each of the solid-state switch elements is connected between one of the DC input terminals and each of the AC output terminals;

G groups of DC power sources of which each group has a pair of DC output terminals;

a closed loop of DC line connecting the pairs of the DC output terminals of the G groups of DC power sources and the pairs of the DC input terminals of the G groups of m-phase inverter units with the DC power sources and the inverter units being alternately arranged in the connection.

2. A motor drive apparatus according to claim 1 wherein:

G groups of the m-phase AC windings have a phase difference between at least one pair of the groups thereof with respect to the electromotive force thereof, and G groups of the m-phase inverter units have a phase difference between at least one pair of the groups thereof with respect to conductive control of solid-state switch elements thereof.

3. A motor drive apparatus according to claim 1 wherein:

each group of the DC power sources consists of a rectifier unit having AC source terminals connected to each of G groups of AC power sources, and the AC power sources have a phase difference between at least one pair of the groups thereof with respect to the AC voltage thereof.

4. A motor drive apparatus according to claim 1 wherein:
the AC motor further comprises a common stator core having an air gap surface around which an arrangement of conductors of the AC windings is disposed, and each phase belt of conductors of each phase of each group of the G groups of m-phase AC windings is assigned to a part of the arrangement which is divided into a number m.G of parts per $2\pi$ of electrical angle around a circumference of the air gap surface.

5. A motor drive apparatus according to claim 1 wherein:
the AC motor further comprises a common stator core having an air gap surface around which an arrangement of conductors of the AC windings is disposed, and each phase belt of conductors of each phase of each group of the G groups of m-phase AC windings is assigned to a part of the arrangement which is divided into a number m.G of parts per $\pi$ of electrical angle around a circumference of the air gap surface.

6. A motor drive apparatus according to claim 1 wherein:
the AC motor is a synchronous motor which comprises a main field winding for commonly providing a field flux to all of the G groups of m-phase AC windings.

7. A motor drive apparatus according to claim 6 wherein:
the synchronous motor further comprises a second field winding.

8. A motor drive apparatus according to claim 1 wherein:
the AC motor is an induction motor which comprises a cage type rotor and a stator, all of the G groups of m-phase AC windings being equipped with the stator.

* * * * *